United States Patent
Jetley et al.

(10) Patent No.: US 12,153,406 B2
(45) Date of Patent: Nov. 26, 2024

(54) METHOD AND SYSTEM TO GENERATE CONTROL LOGIC FOR PERFORMING INDUSTRIAL PROCESSES

(71) Applicant: ABB Schweiz AG, Baden (CH)

(72) Inventors: Raoul Jetley, Bangalore (IN); Divyasheel Sharma, Bangalore (IN); Abdulla Puthan Peedikayil, Thalassery (IN); Dirk Schulz, Meckenheim (DE); Vadthyavath Ramu, Bengaluru (IN)

(73) Assignee: ABB Schweiz AG, Baden (CH)

( * ) Notice: Subject to any disclaimer, the term of this patent is extended or adjusted under 35 U.S.C. 154(b) by 390 days.

(21) Appl. No.: 17/419,514

(22) PCT Filed: Dec. 20, 2019

(86) PCT No.: PCT/IB2019/061178
§ 371 (c)(1),
(2) Date: Jun. 29, 2021

(87) PCT Pub. No.: WO2020/141394
PCT Pub. Date: Jul. 9, 2020

(65) Prior Publication Data
US 2022/0091594 A1    Mar. 24, 2022

(30) Foreign Application Priority Data
Dec. 31, 2018   (IN) .............................. 201841049905

(51) Int. Cl.
*G05B 19/418* (2006.01)
(52) U.S. Cl.
CPC .................. *G05B 19/41865* (2013.01); *G05B 2219/31449* (2013.01)
(58) Field of Classification Search
CPC .... G05B 19/41865; G05B 2219/31449; G05B 2219/13023; G05B 19/0426
See application file for complete search history.

(56) References Cited

U.S. PATENT DOCUMENTS

2013/0185050 A1   7/2013 Bird et al.
2016/0314106 A1*  10/2016 Carrier .................. G06F 40/189
(Continued)

OTHER PUBLICATIONS

Ghosh, S., Elenius, D., Li, W., Lincoln, P., Shankar, N., & Steiner, W. (2016). Arsenal: Automatic requirements specification extraction from natural language. Lecture Notes in Computer Science, 41-46. https://doi.org/10.1007/978-3-319-40648-0_4 (Year: 2016).*

(Continued)

*Primary Examiner* — Thomas C Lee
*Assistant Examiner* — Tyler Dean Hedrick
(74) *Attorney, Agent, or Firm* — Leydig, Voit & Mayer, Ltd.

(57) ABSTRACT

The invention relates to a method and system to generate control logic for performing industrial processes with a controller in a process plant. The method includes receiving a control narrative comprising one or more control requirements of the industrial process, and extracting a plurality of control entities and a plurality of set points, from the control narrative using one or more sets of predetermined regular expressions and one or more models. The method further includes identifying a set of inputs, outputs and control elements from the plurality of control entities using a domain dictionary, detecting a plurality of actions from the control narrative using an intent classifier, identifying a relationship between the set of inputs, outputs and control elements, the plurality of set points, and the plurality of actions, and generating based on the relationship identified the control logic for the controller to perform the process.

6 Claims, 5 Drawing Sheets

(56) References Cited

U.S. PATENT DOCUMENTS

2017/0293276 A1* 10/2017 Hubauer ........... G06F 16/24522
2018/0096108 A1   4/2018 Chkoundali et al.
2019/0129938 A1* 5/2019 Yao ...................... H04L 12/282

OTHER PUBLICATIONS

Indian Patent Office, International Search Report for IN201841049905, Aug. 18, 2020, 7 pages.
European Patent Office, International Search Report for PCT/IB2019/061178, Mar. 26, 2020, 3 pages.
European Patent Office, Written Opinion for PCT/IB2019/061178, Mar. 26, 2020, 6 pages.

* cited by examiner

METHOD AND SYSTEM TO GENERATE CONTROL LOGIC FOR PERFORMING INDUSTRIAL PROCESSES

CROSS-REFERENCE TO RELATED APPLICATIONS

This application is a U.S. national stage of International Application Serial No PCT/IB2019/061178, filed Dec. 20, 2019, which claims priority to Indian Patent Application No. 201841049905, filed Dec. 31, 2018. The entire disclosures of both of the foregoing applications are incorporated herein by reference.

FIELD OF THE INVENTION

The present invention relates generally to control systems in an industrial process plant. More particularly, the present invention relates to methods and systems for generating control logic for control systems to perform industrial processes.

BACKGROUND OF THE INVENTION

Monitoring and control of various industrial processes in a process plant are automated by use of control systems. In order to automate an industrial process, a control system (e.g., a programmable logic controller, PID controller, or a distributed control system) associated with the industrial process needs to be programmed based on requirements of the industrial process. Generally, control systems are programmed using control logic to control and monitor the industrial process. Typically, requirements are synthesized by the customers or Engineering, Procurement and Construction (EPC) contractors and provided in some formal or semi-formal representation, including, for example, input/output tag lists, piping and instrumentation diagrams (P&ID), and control narratives.

Input/output tag lists define a topology of the control system, P&IDs give a graphical specification of the piping, passive process equipment and control relevant active process equipment, and control narratives give a textual description of requirements of the industrial processes. While the input/output tag lists and P&IDs are in a structural notation, and can be easily understood by the control system, the control narratives need to be interpreted and converted into control logic diagrams that can be provided as input to the control systems.

The control narratives usually consist of a textual description of the control logic philosophy and may contain tables, images or a combination thereof. Currently, an automation engineer is required to understand, interpret and convert the requirements of the industrial processes provided within the control narratives, into domain-specific languages/control diagrams (e.g., IEC-61131-3 or IEC 61499 notations).

Engineers are assumed to have the competence to define control logic in a domain-specific language. However, interpreting requirements in control narratives is subjective for example due to differences in the way control narratives may be written (e.g. different expression (in words/images) of the same narrative by different personnel). Further, converting them to control logic is time consuming and prone to error due to misinterpretation of the requirements.

In view of the above, there is a need for a method and a system that can automatically extract the control logic from the control narrative and provide the control logic/control program to the control system for performing the industrial process.

SUMMARY

An aspect of the invention provides a method for performing industrial processes with a controller in a process plant. The method includes, receiving a control narrative associated with the process, where the control narrative comprises one or more control requirements of the industrial process.

The method further includes extracting a plurality of control entities and a plurality of set points from the control narrative using one or more sets of predetermined regular expressions and one or more models for identifying named entities in the control narrative. In an embodiment, each set point of the plurality of set points is associated with a control entity of the plurality of control entities.

The method further includes, identifying a set of inputs, outputs and control elements from the plurality of control entities using a domain dictionary. The domain dictionary identifies inputs, outputs and control elements for a predetermined industry. The method further includes, detecting a plurality of actions from the control narrative using an intent classifier. The intent classifier identifies actions using keywords related to the plurality of actions and lexicons of the keywords.

The method further includes, identifying a relationship between the set of inputs, outputs and control elements, the plurality of set points, and the plurality of actions. The method further includes, generating the control logic, based on the relationship identified, for the controller to perform the process.

In an embodiment, the set of inputs, outputs and control elements, the plurality of set points and the plurality of actions are mapped to the plurality of control entities. Further, the relationship is identified between the plurality of control entities based on the mapping derived between the set of inputs and outputs for each control entity, the plurality of set points and the plurality of actions. Furthermore, one or more control logic blocks is generated based on the relationship identified between the plurality of control entities, the plurality of set points and the plurality of actions.

An aspect of the invention provides a system for generating a control logic for performing a process with a controller of a process plant. In an embodiment, the system is a server that is communicatively coupled to the controller over a communication network. The system includes an input interface, a processor, and an output interface.

The input interface receives a control narrative associated with the industrial processes, where the control narrative comprises one or more control requirements of the industrial process. In an embodiment, the input interface is a human machine interface via which a user inputs a document containing the control narrative in a human readable format.

The processor extracts a plurality of control entities and a plurality of set points from the control narrative using one or more sets of customer-specific or domain-specific predetermined regular expressions and one or more models for identifying named entities in the control narrative. In an embodiment, each set point of the plurality of set points is associated with a control entity of the plurality of control entities. In an embodiment, one or more sets of predetermined regular expressions and one or more models, is retrieved by the input unit from a data storage. In an embodiment, the data storage is a database that is internally coupled to the system. In another embodiment, the data storage is a database server is present over a cloud network and is accessed externally by the input unit.

In an embodiment, the processor builds a first model from a set of documents comprising a set of annotations associated with a set of control entities. The first model comprises a mapping between the set of annotations to a set (first set) of regular expressions, where an annotation of a control entity is based on a domain of the industrial process. Further, the processor builds a second model associated with a set of set points, where the second model comprises a mapping between a set of annotations associated with the set of set points to the another set (second set) of regular expressions, where an annotation of a set point is based on a domain of the industrial process. It is also possible to have one unified model which has the capability to identify both control entities as well as set points. Thus, regular expressions identified beforehand (e.g. provided by expert, extracted from a database) are used along with specific models (e.g. machine learning or NLP) for identifying control entities and set points.

Further, a plurality of actions is detected from the control narrative using an intent classifier, where the intent classifier identifies actions using keywords and lexicons of the keywords. A set of inputs, outputs and control elements from the plurality of control entities is identified using a domain dictionary, wherein the domain dictionary identifies inputs, outputs and control elements for a predetermined industry. Further, a relationship is identified between the set of inputs, outputs and control elements, the plurality of set points, and the plurality of actions. Further, the control logic is generated for the controller to perform the process, where the control logic is based on the relationship identified between the set of inputs, outputs and control elements, the one or more set points and the one or more actions.

The output interface communicates the control logic generated to the controller over the communication network. In an embodiment, the output interface is a wireless interface capable of communicating the generated control logic over the communication network. The controller is capable of executing the control logic for performing the process.

DETAILED DESCRIPTION

Figure 1:
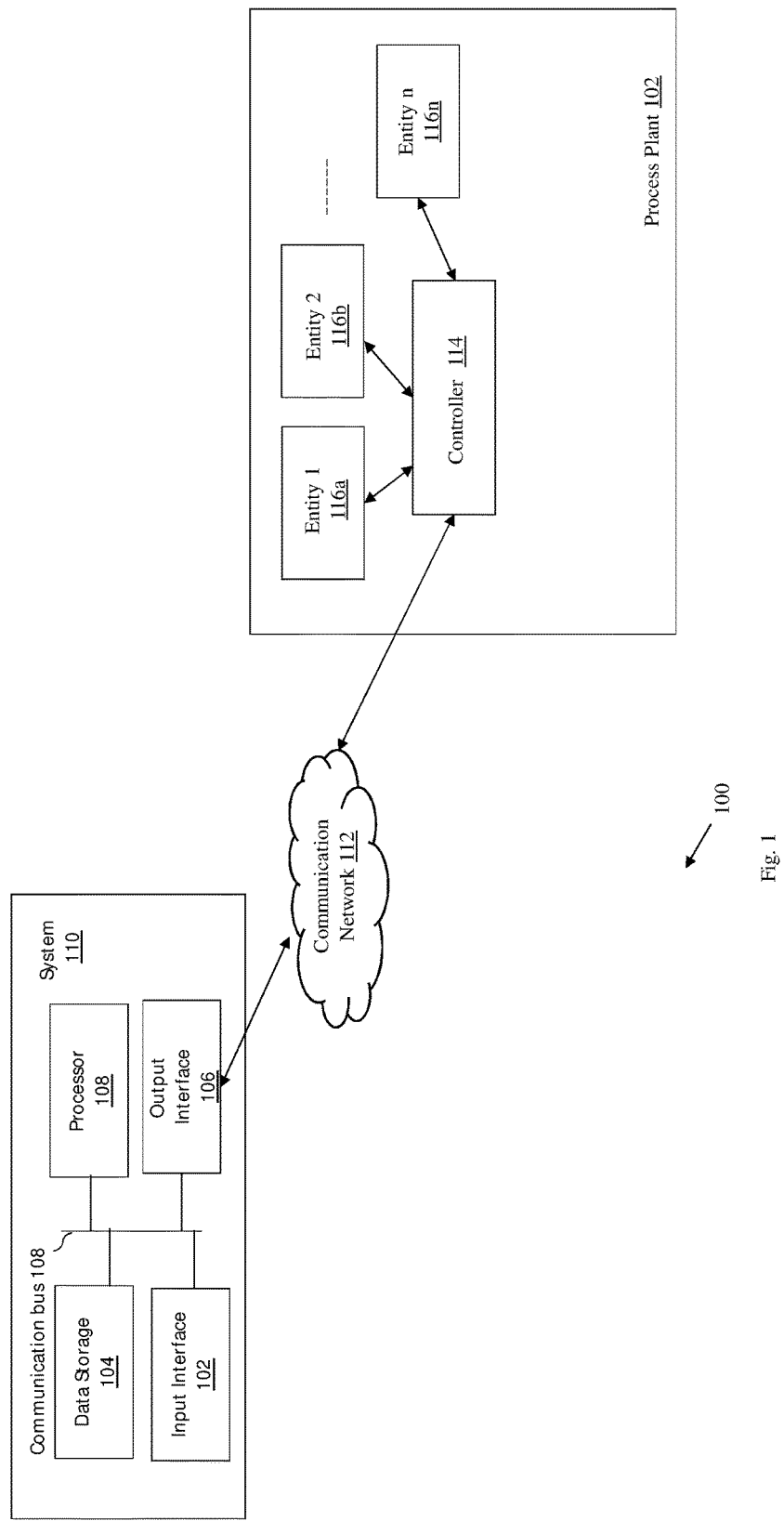
FIG. 1 is a simplified view of an environment in which various embodiments of the present invention can be practiced.

The present invention is related to generating a control logic required for performing an industrial process with a controller of a process plant. Various embodiments of the present invention can be practiced in an environment such as environment 100 shown in FIG. 1. The environment 100 shown in FIG. 1 shows a process plant (102) where a controller (114) is connected to a plurality of entities/process elements (116*a-n*) for performing an industrial process. For example, in a pulp and paper process plant, a controller (or a distributed control system) may control operations of plurality of entities such as a motor, a conveyor belt, and a plurality of control valves that facilitate movement of the pulp along conduits during the process of manufacturing paper.

The controller is also in communication with a system (110) over a communication network (112). In an embodiment, the system generates a control logic for the controller for performing the industrial process. The control logic is communicated in a machine-readable form (e.g., XML format) to the controller over the communication network. Though the environment shows a single controller receiving the control logic for a particular industrial process from the system, it is understood that multiple controllers operating within a single process plant can receive control logic associated with multiple industrial processes from a single system or multiple systems. The multiple systems can communicate over a single or multiple communication networks (e.g. control network, plant network, internet etc.).

In an embodiment, the system includes a computing device (e.g. a server) capable of communicating over a cloud network. As shown, the system includes a plurality of modules such as an input unit (102), a processor (108), a communication unit (106) and a data storage (104). The plurality of modules can communicate with each other via a communication bus 108. The communication bus can be dedicated interfaces (e.g. wired lines or suitable I/Os) that connect the plurality of modules.

The input unit can be a human machine interface that receives a control narrative associated with the industrial process from a user. The control narrative can include one or more control requirements of the industrial process in a human readable format. The control narrative provides a textual description of the logic required to control and monitor the operations of the process plant. In an example, where the process plant is a pulp and paper process plant that manufactures paper, a control narrative can be provided for a controller that performs multiple actions as a part of the process of manufacturing paper.

The processor can include a single processor or multiple processors that operate in parallel. In an embodiment, the processor can parse the control narrative to obtain a plurality of expressions. The processor can extract a plurality of control entities and a plurality of set points from the plurality of expressions using one or more sets of predetermined regular expressions and one or more models used for identifying named entities (e.g. custom entity recognition models) in the control narrative.

The regular expressions are already identified for example provided by an expert, or read from domain specific databases etc. The custom entities are defined using the system, by an operator to denote/annotate other objects (e.g. control entities). Thus, the custom entities provided as input help in training of the model (e.g. based on NLP or machine learning) to identify objects (control entities, set points etc.) in addition to the objects being identified using the regular expressions (e.g. defined by experts). Accordingly, there are two separate channels for identifying objects—one using regular expressions and one using the models. The output of both are combined to arrive at the final set of objects.

In an embodiment, the processor extracts a plurality of control entities from the plurality of expressions based on a first set of predetermined regular expressions (Tagged regular expressions created using expert knowledge or domain database) and a first model. The first set of predetermined regular expressions identify control entities as defined using known data of control entities. For example, these can be control entities defined by experts beforehand, identified from domain databases/rules etc.

The first model comprises a mapping between a set of annotations associated with control entities, where an annotation of a control entity is based on a domain of the industrial process. Such annotation is created (during training of the model) by an expert to indicate control entity. The processor can build the first model from a set of documents (training set) comprising a set of annotations associated with a set of control entities. The training set is developed by subject matter experts who provide the set of annotations based on domain knowledge. Upon receiving the training set, the processor can apply natural language processing (NLP) based Deep Learning techniques such as, but not limited to, Conditional Random Fields or Recurrent Neural Networks on the training set to train and develop the first model.

In the embodiment, the processor extracts a plurality of set points from the plurality of expressions based on a second set of predetermined regular expressions (Tagged regular expressions) and a second model. Each set point of the plurality of set points is associated with a control entity of the plurality of control entities. The second set of predetermined regular expressions identifies set points that are known beforehand for example defined by experts, from domain databases etc. The second model comprises a mapping between a set of annotations associated with the set of set points, where an annotation of a set point is based on a domain of the industrial process. Such annotation can be provide by experts for training. The processor can build the second model from a set of documents (training set) comprising a set of annotations associated with a set of set points. The training set is developed by subject matter experts who provide the set of annotations based on domain knowledge. Upon receiving the training set, the processor can apply natural language processing (NLP) based Deep Learning techniques such as, but not limited to, Conditional Random Fields or Recurrent Neural Networks on the training set to train and develop the second model.

It is mentioned above that there are separate models for identifying control entities and set points, where each model is built using regular expressions and machine learning or NLP. However, it should be noted that there can be one unified model created to identify both control entities and set points. Thus, the combination of regular expressions with custom entity recognition is used to identify objects such as control entities and set points.

Continuing with the above description, consider an example where a control narrative may contain text such as "Sea water is to be filtered and stored in a filtration tank where the temperature needs to be below 21 degree C. . . . ." In this example, a set point 21 degree C. is identified using the regular expression for degree C. (a unit for measuring temperature). Further, the set point is also identified using on a machine learning model that may be trained on a number of training examples containing temperature entities as set points.

In an embodiment, the first model and the second model is a Custom Named Entity Recognition (CER) algorithm that labels the control narrative and is used in combination with the first set of predetermined regular expressions and second set of predetermined expressions (Tag Regular Expressions) to maximize the detection of control entities and set points. The first and second predetermined set of expressions and the first and second model is retrieved from the data storage 104, communicatively coupled to the system. Extraction of control entities can be explained in reference to a control narrative shown in Illustration 1, given below:

---

Illustration 1

The pressure controller, PIC-0152, controls the pressure of a production header, by operating the pressure control valve, PV-0152. The pressure controller, PIC-0146, controls the pressure of the production-header-A, by operating the pressure control valve, PV-0146. To maintain the differential pressure across the production headers, the manual set point in the pressure controller PIC-0152 is greater than in the pressure controller PIC-0146. The flow control, FIC-0555, manipulates the flow of the blending line through the control valve, FV-0555. The operator sets the set point for this flow controller.
The pressure differential controller, PDIC-0555, seeks to maintain the pressure over the blending line. The set point for the pressure differential controller, PDIC-0555, is calculated in the block, PY-0555B, which calculates the difference of set points of pressure controllers, PIC-0152 and PIC-0146. The process variable for PDIC-0555 is calculated in the block, PY-0555A, which calculates the differential pressure over the blending line by subtracting the process variables of PIC-0152 and PIC-0146.
To prevent increasing the flow when the differential pressure decrease, the low signal selector, FY-0555, selects the output signal from the pressure differential controller, PDIC-0555, by closing the control valve FV-0555.

---

In the control narrative of Illustration 1 shown above, the plurality of control entities found based on a first set of predetermined expressions, and a first model associated with control entities are PIC-0152, PV-0152, PIC-0146, PV-0146, FIC-0555, FV-0555, PDIC-0555, PY-0555A, PY-0555B, and FY-0555, where PIC-0152, and PIC-0146 are annotation of a pressure controller, PV-0152, PV-0146, are annotations to pressure control valves, FIC-0555 is an annotation for a flow control, FV-0555 is an annotation for a control valve, FY-0555 is an annotation for a low signal selector, PDIC-0555 is an annotation for a pressure differential controller, and PY-0555A and PY-0555B are annotations of blocks were difference in set points of pressure controllers are calculated. Aforesaid annotations can be defined in the first model by a subject matter expert.

In the example, a set point associated with the pressure controlled by pressure controller PIC-0146 (a control entity in this example) can be 15 Pascal (not shown in the Illustration herein), at which the pressure controller PIC-0146 operated the production header A by operating the pressure control valve PV-0152. The set point associated with the pressure value can be extracted using a second set of predetermined expressions related to set points, and a second model associated with set points.

Upon extracting the plurality of control entities present in the control narrative, the processor identifies a type or category for each control entity using a database of control entities. In an embodiment, the database of control entities identifies a plurality of types of control entities associated with a plurality of industrial processes. For example, ISA (The International Society of Automation) nomenclature can be used to identify a specific type of the each control entity. For example, in the control entities identified in the Illustration 1, can be categorized into different categories or types (e.g. controllers, valves and other entities) using the ISA as shown in Table 1 below:

TABLE 1

| Controllers | Valves | Other Entities |
| --- | --- | --- |
| PIC-0152 | PV-0152 | PY-0555A |
| PIC-0146 | PV-0146 | PY-0555B |
| FIC-0555 | FV-0555 | FY-0555 |
| PDIC-0555 | | |

Further, the processor is configured to identify a set of inputs, outputs and control elements from the plurality of control entities using a domain dictionary, where the domain dictionary identifies inputs, outputs and control elements for a predetermined industry. In an embodiment, a Domain Defined Dictionary (DDD), defines the nomenclature for control entities applicable to a particular industry. For example, an excerpt of a sample domain-driven dictionary for an Oil & Gas project is illustrated in Table 2 as below:

TABLE 2

| Control Entity | Category of control entity |
| --- | --- |
| Pressure Transmitter | Input |
| Level Transmitter | Input |
| Valve | Output |
| Pressure Controller | Control element |

Further based on the type of each control entity as identified from the standard nomenclature (e.g. ISA) and a category of each control entity identified from the domain dictionary, the plurality of control entities can be classified as inputs, outputs or other control entities. An example of classification of the control entities using Table 1 and Table 2, is shown in Table 3 below:

TABLE 3

| Identified Inputs | Identified Outputs |
| --- | --- |
| PT-0152 | PV-0152 |
| PT-0146 | PV-0146 |
| FT-0555 | FV-0555 |

The processor is configured to detect a plurality of actions from the control narrative using an intent classifier, wherein the intent classifier identifies actions using keywords and lexicons of the keywords. For example, an intent classifier and a set of synonyms for each keyword, may be used to identify the plurality of actions present in the control narrative. For example, in the last paragraph of the Illustration 1, which states " . . . increasing the flow when the differential pressure decrease, the low signal selector, FY-0555, selects the output signal from the pressure differential controller, PDIC-0555, by closing the control valve FV-0555", 'increasing the flow' is mapped to an action associated with 'decreasing the pressure and closing the control valve'.

Further, the processor identifies a relationship between the set of inputs, outputs and control elements, the plurality of set points, and the plurality of actions. Identifying the relationship can include identifying relationship between the various identified objects (control entities), as well across different control blocks or elements. In an embodiment, inputs, outputs, set points and actions are mapped to control entities, and connections between control entities are identified using Co reference resolution or dependency parsing. In the illustration 1, by applying coreference resolution to the sentence "as pressure controller, PIC-0152, controls the pressure of a production header, by operating the pressure control valve PV-0152", a relationship between PIC-0152 to PV-0152 is identified as shown in FIG. 2A.

Figure 2:
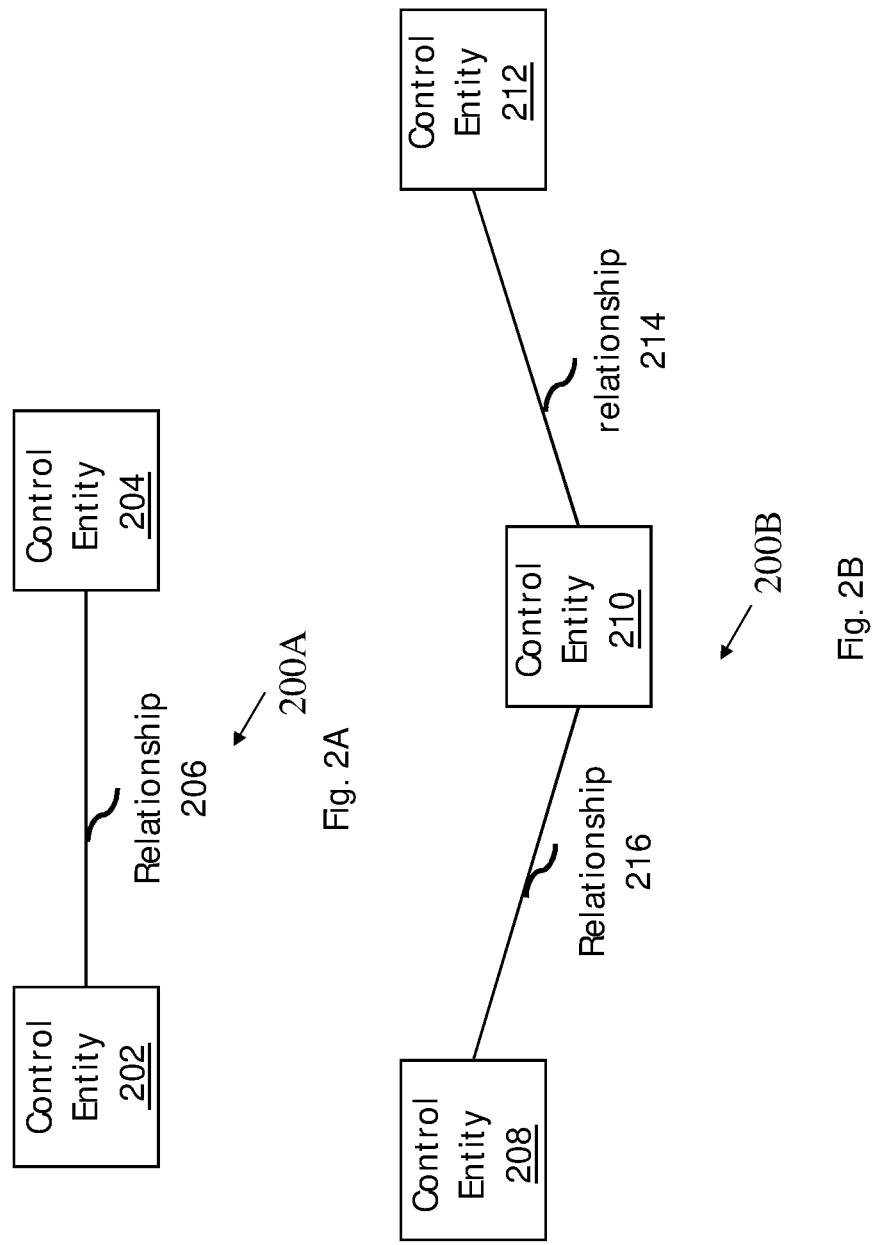
FIG. 2A-2B are example illustrations of relationships identified between control entities of an example control narrative, according to an embodiment of the present invention.

FIG. 2A is an example illustration 200A, of a relationship identified between control entity 204 (e.g. PV-0152) and control entity 202 (e.g. PIC-0152). By applying reference resolution, control entity 204 is identified as an output via relationship 206, to the control entity 202 (e.g. PIC-0152). Similarly, relationships between other entities of the control narrative of Illustration 1, can be identified as shown in FIG. 2B.

FIG. 2B illustrates a relationship 400B identified between control entity 208 (e.g. FIC-0555), control entity 210 (e.g. FV-0555) and control entity 212 (PDIC-0555). Entity 210 (FV-0555) is identified as an output 216 to entity 208 (FIC-0555), and the entity 212 (PDIC-0555) is identified as an output 214 to the entity 210.

Upon identifying the relationships between the set of inputs, outputs and control elements, the one or more set points and the one or more actions, the processor generates the control logic for the controller to perform the process. In an embodiment, the processor generates a plurality of control logic blocks based on the relationship identified. Further the processor, maps each control logic block to a control library module existing in a library of modules, based on a semantic similarity score. For example, a control logic block is mapped to a control library module, if a semantic similarity score obtained by comparing semantics of the control logic block and the control library module is greater than predefined threshold.

Accordingly, the processor generates a plurality of control library modules from the plurality of control logic blocks. The processor generates the control logic in a machine-readable format (e.g. eXtensible Markup language (XML format)) from the plurality of control library modules. In an example, a control builder tool including a plurality of reusable control libraries is used with the processor to generate the control logic for the controller (e.g. AC 800M controller).

In an example, once the control blocks are mapped to control library modules and the set of inputs, outputs, and control elements are connected, an XML file is created to generate the corresponding control logic in a platform neutral notation. Illustration 2 below, shows an example XML schema representing a generated control logic.

Illustration 2

```
<?xml version="1.0" encoding="utf-8"?>
<CN Type="Text" Name="Control Description for boiler">
    <ControlLogic>
        <Variables>
            <variableName="" />
```

-continued

Illustration 2

```
    </Variables>
    <Functions>
      <Function TagName="">
        <Input Name="" />
        <Input Name="" />
        </Output Name=""/>
      </Function>
    </Functions>
    <Connections>
        </Connection Scc="" Dest=""/>
    </Connections>
  </ControlLogic>
</CN>
```

Further, Illustration 3, shows a generated XML file for the example control narrative. depicted in Illustration 1 above.

Illustration 3

```
<?xml version="1.0" encoding="utf-8"?>
<CN Type="Text" Name="Control Description for boiler">
  </ControlLogic>
    <Variables>
      <variable Name= "PT-0251" type="input" />
      <variable Name= "SP-0251" type="input" />
      <variable Name= "PV-0251" type="output" />
      <variable Name= "PT-6041" type= "input" />
      <variable Name= "FT-0255" type= "input" />
      ... ... ... ... ... ..
      ... ... ... ... ... ..
    </Variables>
    </Functions>
      <Function TagName="PIC-0251">
        <Input Name="PT-0251" />
        <Input Name="SP-0251" />
        <Output Name="PV-0251"/>
        <Action Value="" />
      </Function>
      ... ... ... ... ... ..
      ... ... ... ... ... ..
    </Functions>
    <Connections>
      <Connection 5cc"PT-0251" Dest="PIC-0251.PT-0251">
      <Connection 5cc"PIC-0251.PV-0251" Dest"PV-0251" />
    </Connections>
  </ControlLogic>
</CN>
```

Further, the output interface communicates the control logic in the machine-readable format to the controller over a communication network for performing the process. The controller executes the control logic, to perform the industrial process associated with the control narrative received by the system 110. A method of generating the control logic is explained further in reference to FIG. 3.

Figure 3:
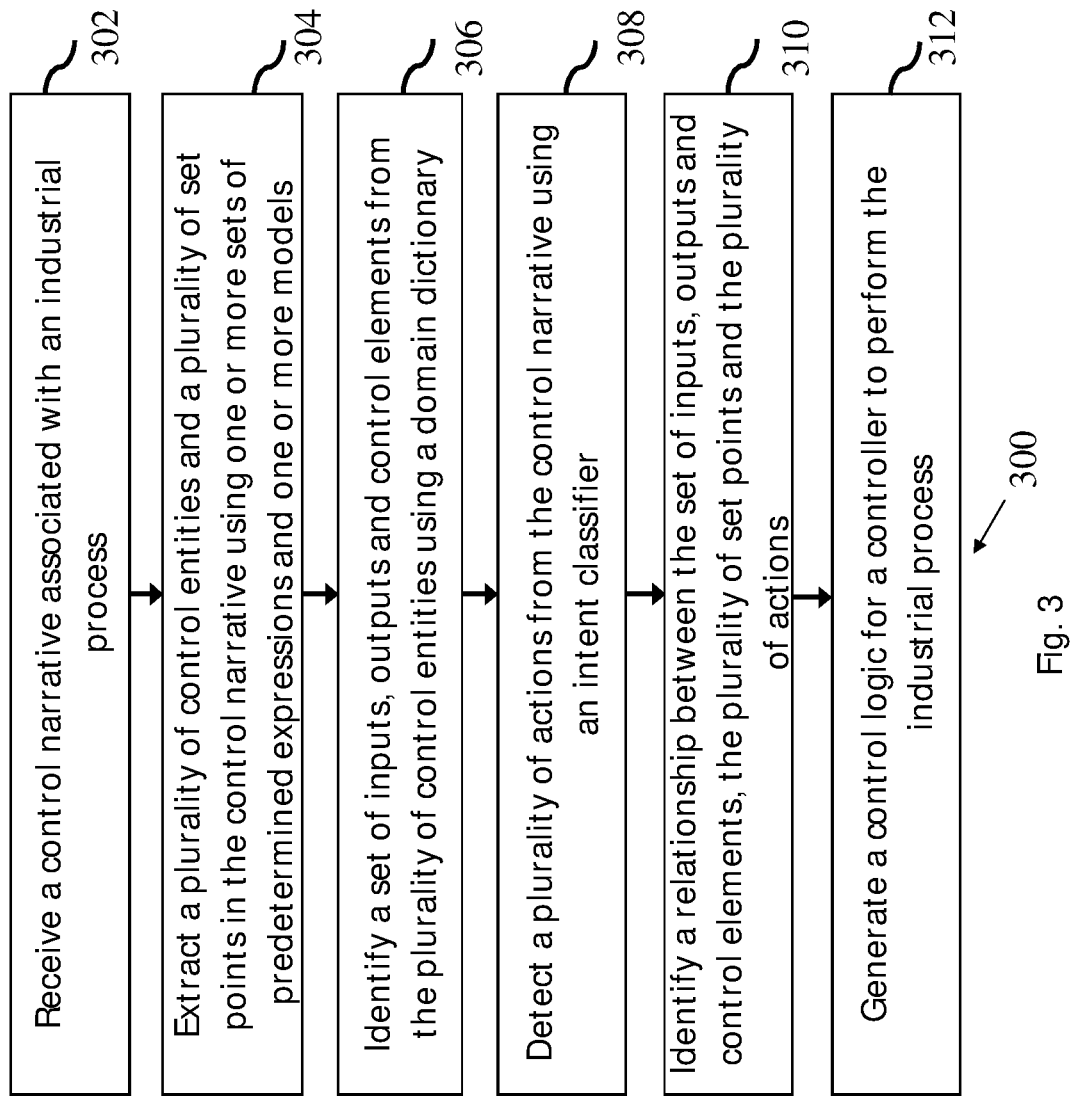
FIG. 3 is a flowchart of a method for performing an industrial process, according to an embodiment of the present invention.

FIG. 3 is a flowchart 300 illustrating a method for generating control logic for performing an industrial process with a controller in a process plant, according to an embodiment of the present invention.

At 302, a control narrative written in a human readable format is received by a system communicatively coupled to the controller. The control narrative includes one or more control requirements of the industrial process to be performed by the controller.

At 304, a plurality of control entities and a plurality of set points are extracted from the control narrative using one or more sets of predetermined regular expressions and one or more models for identifying named entities in the control narrative. Each set point of the plurality of set points is associated with a control entity of the plurality of control entities.

In an embodiment, the control narrative is parsed to obtain a plurality of expressions. Further, a control entity is extracted from the plurality of expressions based on a first set of predetermined regular expressions and a first model. The first set of predetermined regular expressions comprises a mapping between a set of control entities to a set of regular expressions, and the first model comprises a mapping between a set of annotations associated with the set of control entities to the set of regular expressions. An annotation of a control entity is based on a domain of the industrial process.

Further, in the embodiment, a set point is extracted from the plurality of expressions based on a second set of predetermined regular expressions and a second model. The second set of predetermined regular expressions comprises a mapping between a set of set points to another set of regular expressions, and the second model comprises a mapping between a set of annotations associated with the set of set points to the another set of regular expressions. An annotation of a set point is based on a domain of the industrial process.

In another embodiment, a combined set of predetermined regular expressions and a single model is used to extract the plurality of control entities and the plurality of set points. The combined set of predetermined regular expressions comprises a mapping between a set of control entities and a set of set points to a set of regular expressions, where a regular expression associated with a control entity is distinct from a regular expression associated with a set point. Further, the combined model comprises a mapping between a set of annotations associated with the set of control entities and set of set points to the set of regular expressions. Accordingly, an annotation of a control entity being distinct from an annotation of a set point.

Further, a type for each control entity of the plurality of control entities is identified using a database of control entities. In an embodiment, the database of control entities identifies a plurality of types of control entities associated with a plurality of industrial processes.

At 306, a set of inputs, outputs and control elements are identified from the plurality of control entities using a domain dictionary, where the domain dictionary identifies inputs, outputs and control elements for a predetermined industry.

At 308, a plurality of actions is detected from the control narrative using an intent classifier. In an embodiment, an anomaly is detected within the plurality of actions based on a set of rules associated with a domain of the industrial process. Examples of anomalous or ambiguous actions include false positives for actions, a reverse action (an action not identified in terms of control engineering) and the like.

An example of the set of rules includes Domain-defined Rules (DDR) built using the knowledge of the domain experts. For example, a rule may state, "A low signal selector has at least two inputs". Hence if the low signal selector is detected to provide only one input, then based on the rule, an anomaly is detected. Example of another rule is "All variables use same tag numbers as of the controller".

Further, though tags and relationships are identified from the control narrative, there is a chance of some information missing in the control narrative regarding the set of inputs, and outputs or the relations between the identified control narratives. The missing information may be detected using expert input and a natural language processing (NLP) based algorithm built on domain knowledge.

Further, the relationship is updated based one or more of a missing information and a correct information associated with the anomaly.

At 310, a relationship is identified between the set of inputs, outputs and control elements, the plurality of set points, and the plurality of actions. This step involves mapping of the set of inputs, outputs, control elements, the plurality of set points and the plurality of actions to control entities and identifying connections between control entities. In an embodiment, this mapping is determined using CoReference resolution/dependency parsing.

At 312, the control logic is generated for the controller to perform the process, wherein the control logic is based on the relationship identified between the set of inputs, outputs and control elements, the one or more set points and the one or more actions. In an embodiment, the set of inputs, outputs and control elements, the plurality of set points and the plurality of actions are mapped to the plurality of control entities. Further, a relationship between the plurality of control entities is identified based on the mapping derived between the set of inputs and outputs for the each control entity, the plurality of set points and the plurality of actions. Further, one or more control logic blocks is generated based on the relationship identified between the plurality of control entities, the plurality of set points and the plurality of actions. Further, each control logic block is mapped to a control library module existing in a library of modules of a control builder tool and the control logic is generated in a machine-readable format from one or more control library modules, where the one or more control library modules is mapped to the one or more control logic blocks.

Figure 4A:
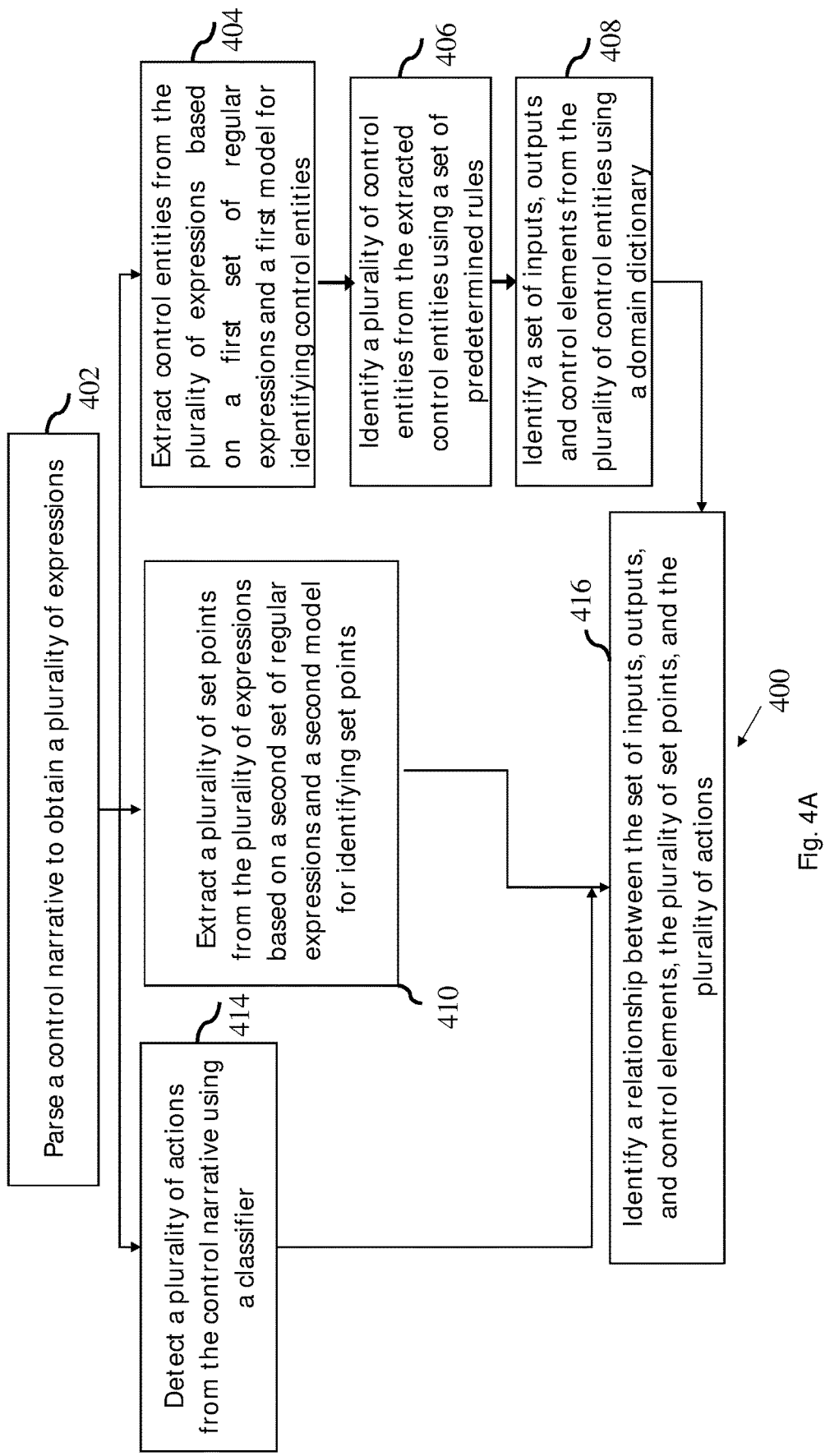
FIG. 4A-4B is a flow diagram for converting a control narrative into a control logic used for performing an industrial process with a controller of a process plant, according to an embodiment of the present invention.
Figure 4B:
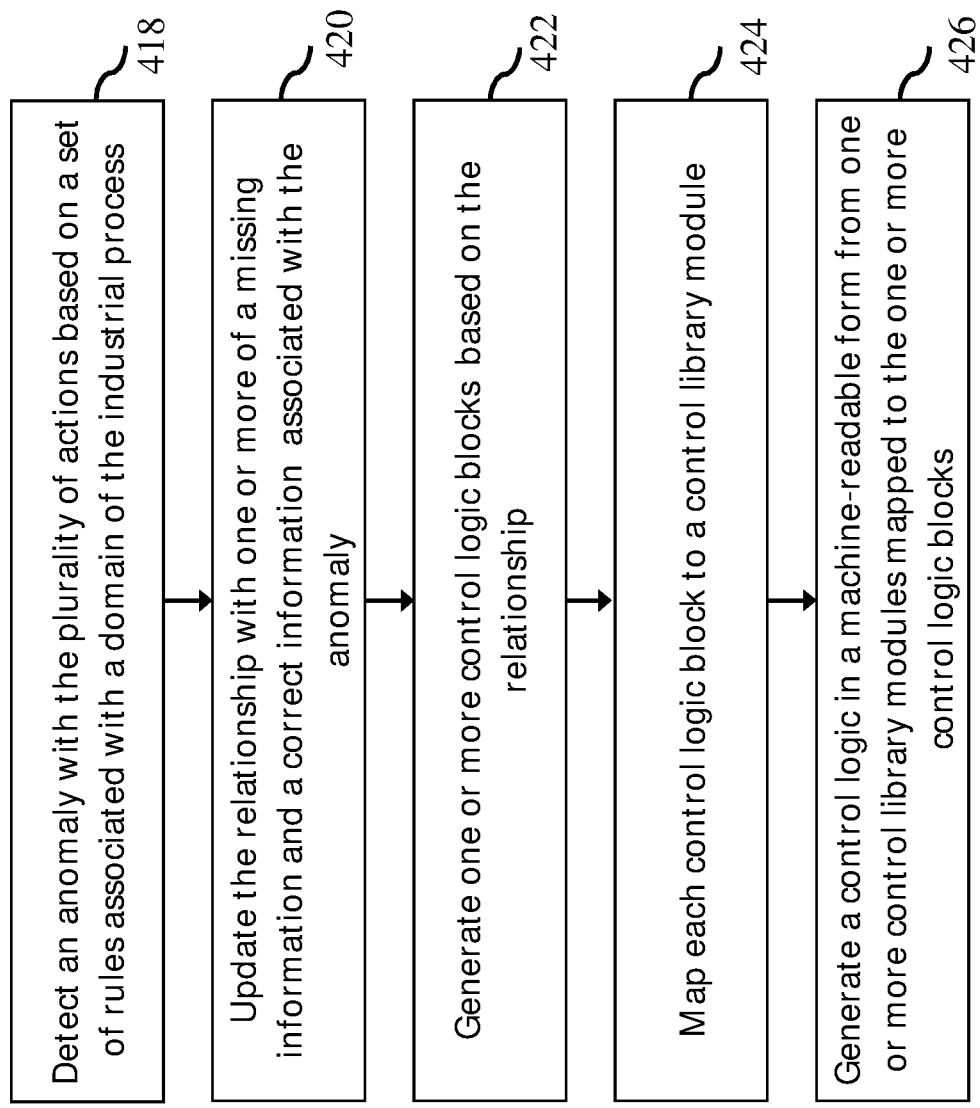

Another embodiment of the method of generating the control logic from a control narrative is explained in reference to FIG. 4A-4B.

FIG. 4A-4B is a flowchart 400 that illustrates a method for generating a control logic from a control narrative, in accordance with another embodiment of the present invention.

At 402, the control narrative is parsed to obtain a plurality of expressions.

At 404, control entities are extracted from the plurality of expressions based on a first set of predetermined regular expressions and a first model (e.g. NLP based model) for identifying control entities. At 406, a plurality of control entities are identified from the extracted control entities using a set of predetermined rules. For example, rules from a standard (e.g. for industrial automation). At 408, a set of inputs, outputs and control elements are identified from the plurality of control entities using a domain defined dictionary.

At 410, a plurality of set points are extracted from the plurality of expressions based on a second set of predetermined regular expressions and a second model for identifying set points.

At 414, a plurality of actions is detected from the control narrative using a classifier (e.g. intent classifier). Upon detecting the set of inputs, outputs, and control elements, the plurality of set points, and the plurality of actions, the method flows to step 416.

At 416, a relationship is identified between the set of inputs, outputs, and control elements, the plurality of set points, and the plurality of actions. This involves identifying control blocks and relations between control blocks as well.

At 418, an anomaly is detected with the plurality of actions based on a set of rules (domain defined rules) associated with a domain of the industrial process.

At 420, the relationship is updated with one or more of a missing information and a correct information associated with the anomaly.

At 422, one or more control logic blocks is generated based on the relationship.

At 424, each control logic block is mapped to a control library module.

At 426, control logic is generated in a machine-readable form from one or more control library modules mapped to the one or more control logic blocks.

Disclosed method and system provides an efficient means to automatically derive control logic from a control narrative associated with an industrial process. The derived control logic is free from ambiguities and facilitates performance of the industrial process in a reliable manner. Further disclosed method is fast and saves time in execution of the industrial process. Further, the generated control logic is in a platform neutral format, which facilitates execution of the control logic on various types and configurations of control systems/controllers.

We claim:

1. A method for generating a control logic for performing an industrial process with a controller in a process plant, the method comprising:
   receiving, with a system associated with the controller in the process plant, a control narrative associated with the industrial process from a user, wherein the control narrative comprises one or more control requirements required for controlling the industrial process;
   extracting, by the system, a plurality of control entities and a plurality of set points from the control narrative using one or more sets of predetermined regular expressions and one or more models stored in a database associated with the system, wherein each set point of the plurality of set points is associated with a control entity of the plurality of control entities, wherein the plurality of control entities control one or more parameters of the industrial process;
   identifying, by the system, at least one of type or category for each of the extracted plurality of control entities, the type being identified using a database of control entities that includes a plurality of types of control entities associated with a plurality of industrial processes, the category being identified using a domain dictionary that defines a nomenclature for control entities applicable to a particular industry, wherein the category of the control entity is a set of inputs, outputs, and control elements;
   detecting, by the system, a plurality of actions from the control narrative using an intent classifier, wherein the intent classifier identifies actions using keywords present in the control narrative;
   identifying, by the system, a relationship between the set of inputs, outputs, and control elements, the plurality of set points, and the plurality of actions using one of coreference resolution or dependency parsing;
   generating, by the system, the control logic for the controller to perform the industrial process, wherein the control logic is based on the relationship identified between the set of inputs, outputs, and control elements, the plurality of set points, and the plurality of actions; and
   providing the control logic to the controller to be executed by the controller to perform the industrial process.

2. The method of claim 1, wherein extracting the plurality of control entities and the plurality of set points comprises:

parsing the control narrative to obtain a plurality of expressions;

extracting a control entity from the plurality of expressions based on a first set of predetermined regular expressions and a first model, wherein the first set of predetermined regular expressions comprises a mapping between a set of control entities to a set of regular expressions, wherein the first model comprises a mapping between a set of annotations associated with the set of control entities to the set of regular expressions, wherein an annotation of a control entity is based on a domain of the industrial process; and extracting a set point from the plurality of expressions based on a second set of predetermined regular expressions and a second model, wherein the second set of predetermined regular expressions comprises a mapping between a set of set points to another set of regular expressions, wherein the second model comprises a mapping between a set of annotations associated with the set of set points to the another set of regular expressions, wherein an annotation of a set point is based on the domain of the industrial process.

3. The method of claim 1, wherein detecting the plurality of actions comprises:

detecting an anomaly within the plurality of actions based on a set of domain defined rules associated with a domain of the industrial process; and updating the relationship with one or more of a missing information and a correct information associated with the anomaly, wherein the missing information is detected using natural language processing built on the domain of the industrial process.

4. The method of claim 1, wherein generating the control logic comprises:

generating one or more control logic blocks, wherein each of the one or more control logic blocks is mapped to a control library module existing in a library of modules based on a semantic score, wherein each semantic score is obtained by comparing semantics of each control logic block to semantics of each control library module; and generating the control logic in a machine-readable format based on the control library module mapped to each of the one or more control logic blocks.

5. A system for generating a control logic for performing a process with a controller of a process plant, wherein the system is communicatively coupled to the controller, the system comprising:

an input interface to receive a control narrative associated with the industrial processes from a user, wherein the control narrative comprises one or more control requirements required for controlling the industrial process; and a processor to (i) extract a plurality of control entities and a plurality of set points from the control narrative using one or more sets of predetermined regular expressions and one or more models stored in a database associated with the system, wherein each set point of the plurality of set points is associated with a control entity of the plurality of control entities, wherein the plurality of control entities control one or more parameters of the industrial process; (ii) detect a plurality of actions from the control narrative using an intent classifier, wherein the intent classifier identifies actions using keywords present in the control narrative; (iii) identify at least one of type or category for each of the extracted plurality of control entities, the type being identified using a database of control entities that includes a plurality of types of control entities associated with a plurality of industrial process es, the category being identified using a domain dictionary that defines a nomenclature for control entities applicable to a particular industry, wherein the category of the control entity is a set of inputs, outputs, and control elements; (iv) identify a relationship between the set of inputs, outputs, and control elements, the plurality of set points, and the plurality of actions using one of coreference resolution or dependency parsing; and (v) generate the control logic for the controller to perform the industrial process, wherein the control logic is based on the relationship identified between the set of inputs, outputs, and control elements, the plurality of set points, and the plurality of actions; and an output interface to communicate the control logic to the controller over a communication network to be executed by the controller for performing the industrial process.

6. The system of claim 5, wherein the processor is further configured to:

build a first model from a set of documents comprising a set of annotations associated with a set of control entities, wherein the first model comprises a mapping between the set of annotations to a set of regular expressions, wherein an annotation of a control entity is based on a domain of the industrial process; and build a second model associated with a set of set points, wherein the second model comprises a mapping between a set of annotations associated with the set of set points to the another set of regular expressions, wherein an annotation of a set point is based on the domain of the industrial process.

* * * * *